Sept. 3, 1957 W. A. REIS 2,805,302
THERMOSTATIC CONTROL MECHANISM
Filed Oct. 22, 1956
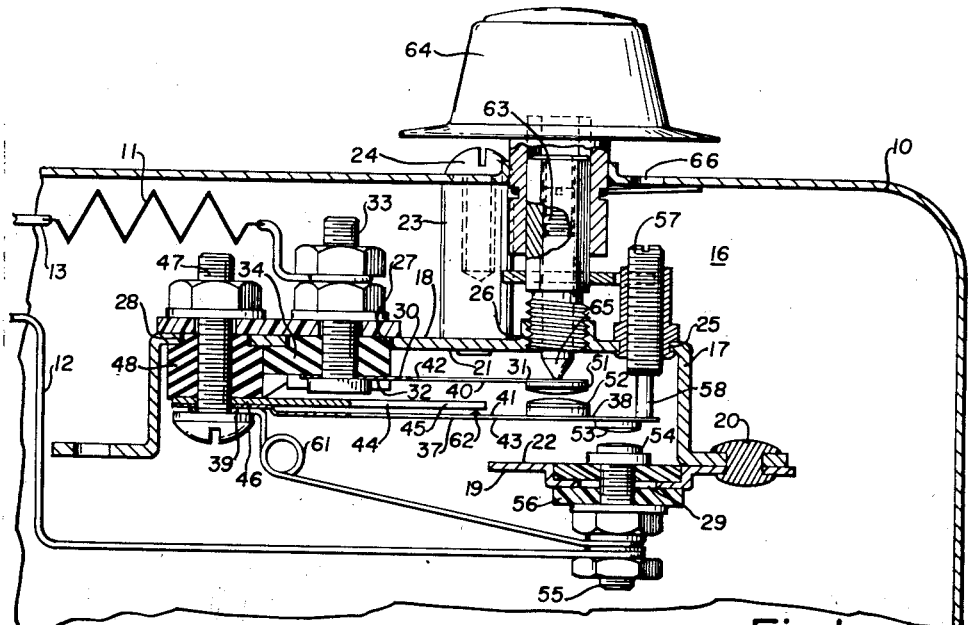
Fig. 1
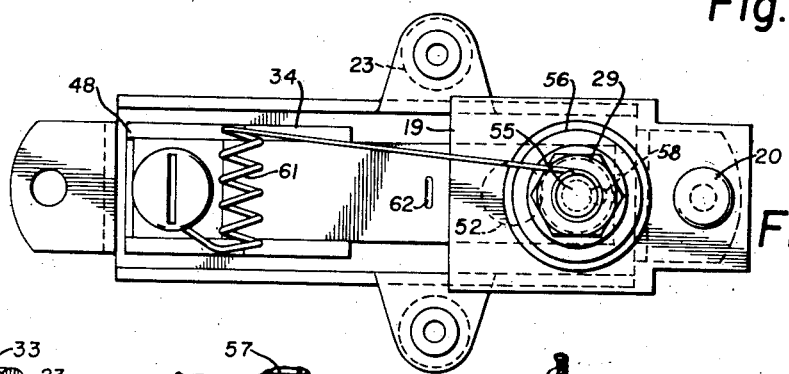
Fig. 2
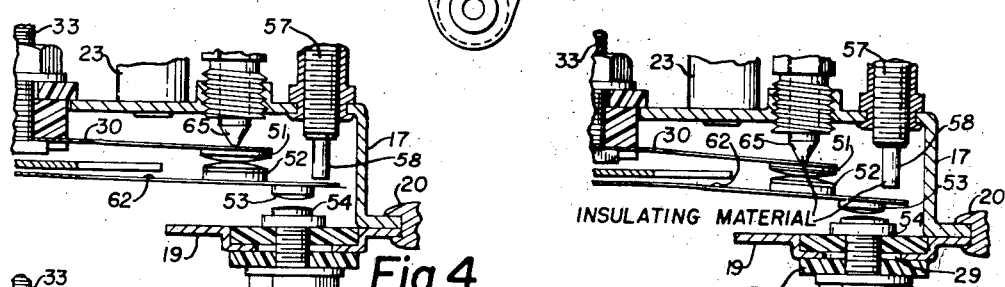
Fig. 4
Fig. 5
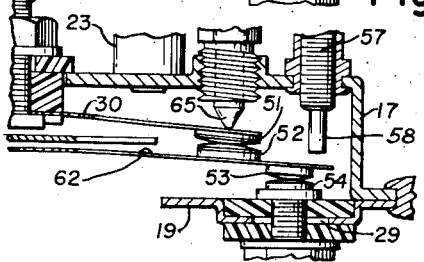
Fig. 3
INVENTOR.
WILLIAM A. REIS
BY *Woodling & Krost*
Atty's.

2,805,302

THERMOSTATIC CONTROL MECHANISM

William A. Reis, Mansfield, Ohio, assignor to Dominion Electric Corporation

Application October 22, 1956, Serial No. 617,417

5 Claims. (Cl. 200—122)

The invention relates in general to thermostats and more particularly to a thermostatic control mechanism adapted to control electrical appliances such, for example, as an automatic table range or other devices.

An object of the invention is the provision of a variable temperature control for electrical heating elements, adjustable to an infinite number of heat controls, thus giving greater flexibility to the use of electricity for cooking purposes.

Another object of the invention is the provision of a thermostatic control mechanism having a heating element which effects a bimetallic strip for controlling the electrical contacts on the thermostatic control mechanism.

Another object of the invention is the provision of shunting the heating element of the thermostatic control mechanism during certain intervals of operation.

Other objects and a fuller understanding of this invention may be had by referring to the following description and claims, taken in conjunction with the accompanying drawing in which:

Figure 1 is a cross-sectional view of an electrical appliance showing the thermostatic control mechanism in sectional side elevation and with the control knob in the "off" position;

Figure 2 is a bottom view of the thermostatic control mechanism, showing principally the heating element for the thermostatic control mechanism;

Figure 3 is a fragmentary side elevational view of the thermostatic control mechanism shown with the control knob turned completely down to its full "on" position;

Figure 4 shows a view similar to Figure 3, but with the control knob in an intermediate position close to the "off" position; and Figure 5 is a view similar to Figure 3, but shows the control knob in an intermediate position close to the full "on" position.

With reference to the drawing, the reference character 10 represents the casing of an electrical appliance such as the casing for an automatic table range or other device. The main heating element for the electrical appliance is indicated by the reference character 11 and is usually mounted on an insulated assembly so that substantially all of the heat is directed to the cooking utensil rather than to the inside of the casing 10. The electrical feed wires for heating the main heating element is indicated by the reference characters 12 and 13.

Mounted on the inside of the casing 10 is the invention of the thermostatic control mechanism and is indicated by the reference character 16. As illustrated in the drawing, all of the parts of the thermostatic control mechanism is carried on a support frame 17 comprising a top or first longitudinally extending mounting portion 18 and a bottom or second longitudinally extending mounting portion 19. The bottom mounting portion 19 is secured to the top mounting portion 18 by means of a rivet 20. The entire thermostatic control mechanism 16 is mounted on the casing 10 by means of mounting studs 23 and mounting screws 24. The top and bottom mounting portions 18 and 19 of the support frame 17 have, respectively, inside surfaces 21 and 22 fixedly spaced apart to provide a space therebetween for the control contacts.

The top or first longitudinally extending mounting portion 18 has space therealong in the order named, a series of at least first, second, third and fourth openings identified by the reference characters 25, 26, 27 and 28. The bottom longitudinally extending portion 18 is provided with a single opening 29. A first flexible contact finger 30 is spaced from and longitudinally disposed along the inside surface 21 of the top mounting portion 18 and has a free-end 31 and a fixed-end 32. First terminal means 33 is disposed externally of the outside surface of the top mounting portion 18 and extends through the third opening 27 in the top mounting portion 18 and is electrically connected to the fixed-end 32 of the first flexible contact finger 30. First insulation means 34 is employed to insulate the first terminal means 33 and the fixed-end 32 of the first flexible contact finger 30 from the top mounting portion 18. The first terminal means 33 and the first insulation means 34 insulatingly support the fixed-end 32 of the first contact finger 30 on the top mounting portion 18.

A second flexible contact finger 37 is spaced from and longitudinally disposed along the first flexible contact finger 30 and has a free-end 38 and a fixed-end 39. The free-end 38 extends into the space between the inside surfaces 21 and 22 of the top and bottom mounting portions 18 and 19, respectively. The first and second flexible contact fingers 30 and 37 constitute a pair and respectively have inside surfaces 40 and 41 and outside surfaces 42 and 43.

A bimetallic strip 44 is located between the first and second flexible contact fingers 30 and 37 and is longitudinally disposed next adjacent and along the inside surface 41 of the second flexible contact finger 37. The bimetallic strip 44 has a free-end 45 and a fixed-end 46. Mounting means 47 extends through the fourth opening 28 in the top mounting portion 18 and is adapted in combination with second insulation means 48 to insulatingly support the fixed-end 46 of the bimetallic strip and the fixed-end 39 of the second flexible contact finger 37 on the top mounting portion 18.

A first electrical contact 51 is mounted on the inside surface 40 of the first flexible contact finger 30 and a second electrical contact 52 is mounted on the inside surface 41 of the second flexible contact finger 37. The first and second electrical contacts 51 and 52 constitute a first pair of engaging contacts. A third electrical contact 53 is mounted in the outside surface 43 of the second flexible contact finger 37. A fourth contact 54 is insulatingly mounted on the bottom mounting portion 19 by means of second terminal means 55 and third insulation means 56. The second terminal means 55 extends through the single opening 29 in the bottom mounting portion 19. The third and fourth electrical contacts 53 and 54 constitute a second pair of engaging contacts.

A threadable pre-setting stop means 57 is disposed externally of the outside surface of the top mounting portion 18 and extends through the first opening 25 thereof. The threadable pre-setting stop means 57 has an insulated portion 58 which engages the inside surface 41 of the free-end of the second flexible contact finger 37 and limits the movement of the free-end of the second flexible contact finger 37 towards the first contact finger 30. The free-end of the second flexible contact finger 37 is normally yielding against the insulated portion 58 of the threadable pre-setting stop means 57 and normally positions the electrical contact 53 at a spaced distance from the fourth contact 54.

Heating element 61 is electrically connected in shunt with the third and fourth contacts 53 and 54 and in series with the first and second contacts 51 and 52 and between the first and second terminal means 33 and 55. The heating element 61 comprises a coil of wire electrically spaced from and disposed adjacent to the outside surface 43 of the second flexible contact finger 37 whereby the second flexible contact finger 37 extends between the heating element 61 and the bimetallic strip 44. The second flexible contact finger 37 constitutes a barrier between the heating element 61 and the bimetallic strip 44. The bimetallic strip 44 is principally affected by the heat of the heating element 61, as the heat from the main heating element 11 of the appliance is ordinarily insulated from the thermostat. The bimetallic strip 44 is effected by the ambient temperature inside the casing 10, but the principal heat which affects the bimetallic strip for controlling the second flexible contact finger is that generated by the heating element 61. As illustrated, the second flexible contact finger 37 is provided with a bump 62 against which the free-end 45 of the bimetallic strip engages when the bimetallic strip is flexed by the influence of heat by the heating element 61. The flexing of the bimetallic strip 44 under the influence of the heating element 61 is such as to move the second flexible contact finger 37 in the direction away from the first electrical contact 51.

Threadable adjustable means 63 is disposed externally of the outside surface of the top mounting portion 18 and extends through the second opening 26 in the top mounting portion 18. The outer end of the threadable adjustable means has a knob 64 exposed externally of the casing 10. The threadable adjustable means 63 has an insulating portion 65 which engages the outside surface 42 of the free-end of the first flexible contact finger 30. The threadable adjustable means 63 adjustably sets the first electrical contact 51 with respect to the second electrical contact 52. As illustrated in the drawing, the threadable adjustable means 63 has a threaded portion of greater length than the combined space between the first and second electrical contacts 51 and 52 and the electrical contacts 53 and 54 to force the contacts 51 and 52 together which in turn force the contacts 53 and 54 together (see Figure 3) to provide an electrical circuit directly between the first and second terminal means 33 and 55. Thus all the electrical contacts are in series and thereby shunt the heating element 61. This is the full "on" position.

The amount of heat generated by the main heating element 11 is dependent upon the period of time the power is "on" as opposed to the time the power is "off." The circuit through the thermostatic control mechanism may be described as follows. Beginning with the electrical feed wire 12, the current flows through the second terminal means 55, the heating element 61, the second flexible contact finger 37, the electrical contacts 52 and 51, the first flexible contact finger 30, the first terminal means 33, the main heating element 11 of the appliance and finally through the electrical feed wire 13. In Figure 1, the control knob 64 is in the "off" position and the contacts 51 and 52 are separated, and thus the circuit is interrupted. The "off" position of the contact 52 is adjusted by turning the threadable pre-setting stop means 57 by using a screw driver which may extend through the small opening 66 in the casing 10. The Figure 4 shows the control knob moved to an intermediate position which is close to the "off" position. In this position, the contact 51 is pressing down against the contact 52 and slightly separates the free-end of the second flexible contact finger 37 from the insulating portion 58 of the threadable pre-setting stop means. In this position, Figure 4, the current flows through the heating element 61 which causes the bimetallic strip 44 to flex downwardly and engage the bump 62 on the second flexible contact finger 37. After the bimetallic strip 44 flexes a sufficient amount it separates the contact 52 from 51 and opens the circuit and de-energizes the heating element 61. In the position shown in Figure 4 it is to be noted that the bimetallic strip 44 does not have to flex very much in order to separate the contact 52 from the contact 51. Therefore, when the heating element 61 is deenergized, the bimetallic strip 44 takes a relatively long time to return to its normal position because the bimetallic strip is under very slight bending stresses. In the setting of the threadable adjustable means 63 in Figure 4 the cycling of the switch may be in the order of 5 seconds "on" and 20 seconds "off," thus maintaining a low heat output on the main heating element 11. However, when the control knob is rotated towards the high position, such as shown in Figure 5, the bimetallic strip 44 has to be flexed more in order to separate the contact 52 from 51. Therefore, when the bimetallic strip 44 is under a high bending stress it will move back relatively quick to permit the contact 52 to engage the contact 51. Under this condition of operation, the "on" time may be 25 seconds and the "off" time 5 seconds maintaining a high heat output on the main heating element 11. Accordingly, as the threadable adjustable means 63 is turned from a low heat position to a high heat position, the cycling shifts from a short period "on" to a long period "on" giving an infinite number of heating positions.

When the control knob is turned completely full "on" (as shown in Figure 3) all of the contacts are closed, thereby completely shunting out the heating element 61 so that the current is on all the time through the main heating element 11. When the thermostatic control mechanism is operated in its full "on" position there is no strain on the bimetallic strip 44 and no alternate heating and cooling of the heating element 61. Also there is no make and break of the contact points, all of which increase the life of the switching parts. The infinite number of heating positions in this invention is accomplished by a very novel arrangement of parts. Thus when the distance bimetallic strip 44 deflects to break the circuit is small, it takes a short period of time to interrupt the circuit. When the deflection is small the binding stress in the bimetallic strip is small and therefore the return of the bimetallic strip 44 towards its original position is slow, during which time the contacts 52 and 51 are held open and the main heating element 11 is de-energized allowing dissipation of stored heat. When the control knob 64 is set in a "low" position as shown in Figure 4, the cycling of the switch may be in the order of 5 seconds "on," 20 seconds "off," thus maintaining a low heat output on the main heating element 11. As the control knob 64 is rotated toward high position, the distance the bimetallic strip 44 must deflect gets increasingly greater to interrupt the circuit and the "on" time becomes increasingly longer while the "off" time becomes increasingly smaller. Therefore, just before contact 53 touches contact 54, such as shown in Figure 5, the "on" time may be 25 seconds and the "off" time 5 seconds, thus maintaining a high heat output on the main heating element 11. An infinite number of heating positions is thus afforded by the novel arrangement of the parts.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A thermostatic control mechanism comprising a support frame having first and second longitudinally extending mounting portions with inside and outside surfaces, said mounting portions being fixedly spaced apart with their inside surfaces oppositely disposed with respect to each other to provide a space therebetween, said first mounting portion having spaced therealong in the order named, a series of at least first, second, third, and fourth openings, said second mounting portion having at least a single opening, a first flexible contact finger spaced from and longitudinally disposed along the inside surface of the first mounting portion and having a free-end and a fixed-end, first terminal means disposed externally of the outside surface of the first mounting portion and extending through said third opening of the first mounting portion and electrically connected to said fixed-end of the first flexible contact finger, first insulation means to insulate said first terminal means and said fixed-end of the first flexible contact finger from the first mounting portion, said first terminal means and said first insulation means insulatingly supporting said fixed-end of the first flexible contact finger on the first mounting portion, a second flexible contact finger spaced from and longitudinally disposed along the first flexible contact finger and having a free-end and a fixed-end, said free-end of the second contact finger extending into the space between the inside surfaces of the first and second mounting portions, said first and second flexible contact fingers constituting a pair and having inside and outside surfaces, a bimetallic strip located between said first and second contact fingers and longitudinally disposed next adjacent and along the inside surface of the second flexible contact finger and said bimetallic strip having a free-end and a fixed-end, mounting means extending through the fourth opening, second insulation means to insulate said mounting means and said fixed-ends of the bimetallic strip and the second flexible contact finger from the first mounting portion, said mounting means and said second insulation means insulatingly supporting the fixed ends of the bimetallic strip and the second flexible contact finger on the first mounting portion, a first electrical contact mounted on the inside surface of the first flexible contact finger, a second electrical contact mounted on the inside surface of the second flexible contact finger, said first and second electrical contacts constituting a first pair of engaging contacts, a third electrical contact mounted on the outside surface of the second flexible contact finger, a fourth electrical contact, second terminal means disposed externally of the outside surface of the second mounting portion and extending through the single opening of the second mounting portion and electrically connected to the fourth contact, third insulation means to insulate the second terminal means and the fourth contact from the second mounting portion, said second terminal means and said third insulation means insulatingly supporting said fourth contact on said second mounting portion, said third and fourth electrical contacts constituting a second pair of engaging contacts, threadable pre-setting stop means disposed externally of the outside surface of the first mounting portion and extending through the first opening in the first mounting portion, said threadable pre-setting stop means having an insulated portion to engage the inside surface of the free-end of the second flexible contact finger, said threadable pre-setting stop means limiting the movement of the free-end of said second flexible contact finger toward the first contact finger, the free-end of said second flexible contact finger normally yielding against the insulated portion of the threadable presetting stop means and normally positioning said third electrical contact at a spaced distance from the fourth contact, a heating element electrically connected in shunt with the third and fourth electrical contacts and in series with the first and second electrical contacts and between the first and second terminal means, said heating element comprising a coil of wire electrically spaced from and disposed adjacent to the outside surface of the second flexible contact finger whereby said second flexible contact finger extends between the heating element and the bimetallic strip, said free-end of the bimetallic strip engaging the inside surface of the second flexible contact finger at a place between the second electrical contact and the fixed-end thereof, said bimetallic strip being responsive to heat from the heating element and flexing its free-end thereof against the inside surface of the second flexible contact finger to move the second electrical contact in a direction away from the first electrical contact, and threadable adjustable means disposed externally of the outside surface of the first mounting portion and extending through the second opening in the first mounting portion, said threadable adjustable means having an insulating portion to engage the outside surface of the free-end of the first flexible contact finger, said threadable adjustable means threadably adjusting the setting of the first electrical contact with respect to the second electrical contact, said threadable adjustable means having a threaded portion of greater length than the combined space between the first and second electrical contacts and the third and fourth electrical contacts to force the first and second electrical contacts together which in turn force the third and fourth electrical contacts together to provide an electrical circuit directly between the first and second terminal means through all said electrical contacts in series and thereby shunting the heating element.

2. A thermostatic control mechanism comprising a support frame having first and second longitudinally extending mounting portions, said mounting portions being fixedly spaced apart and oppositely disposed with respect to each other to provide a space therebetween, a first flexible contact finger spaced from and longitudinally disposed along the first mounting portion and having a free-end and a fixed-end, first terminal means on the first mounting portion and electrically connected to said fixed-end of the first flexible contact finger, first insulation means to insulate said first terminal means and said fixed-end of the first flexible contact finger from the first mounting portion, said first terminal means and said first insulation means insulatingly supporting said fixed-end of the first flexible contact finger on the first mounting portion, a second flexible contact finger spaced from and longitudinally disposed along the first flexible contact finger and having a free-end and a fixed-end, said free-end of the second contact finger extending into the space between the first and second mounting portions, said first and second flexible contact fingers constituting a pair and having inside and outside surfaces, a bimetallic strip longitudinally disposed along the second flexible contact finger and having a free-end and a fixed-end, mounting means on the first mounting portion, second insulation means to insulate said mounting means and said fixed-ends of the bimetallic strip and the second flexible contact finger from the first mounting portion, said mounting means and said second insulation means insulatingly supporting the fixed ends of the bimetallic strip and the second flexible contact finger on the first mounting portion, a first electrical contact mounted on the inside surface of the first flexible contact finger, a second electrical contact mounted on the inside surface of the second flexible contact finger, said first and second electrical contact fingers constituting a first pair of engaging contacts, a third electrical contact mounted on the outside surface of the second flexible contact finger, a fourth electrical contact, second terminal means on the second mounting portion and electrically connected to the fourth contact, third insulation means to insulate the second terminal means and the fourth contact from the second mounting portion, said second terminal means and said third insulation means insulatingly supporting said fourth contact on said second mounting portion, said third and fourth electrical contacts constituting a second pair of engaging contacts, threadable pre-setting stop means on the first mounting portion and having an insulated portion to engage the inside surface of the free-end of the second flexible contact finger, said threadable pre-setting stop means limiting the movement of the free-end of said second flexible contact finger toward the first contact finger, the free-end of said second flexible contact finger normally yielding against the insulated portion of the threadable pre-setting stop means and normally positioning said third electrical contact at a spaced distance from the fourth contact, a heating element electrically connected in shunt with the third and fourth electrical contacts and in series with the first and second electrical contacts and between the first and second terminal means, said bimetallic strip being responsive to heat from the heating element and flexing its free-end thereof against the second flexible contact finger to move the second electrical contact in a direction away from the first electrical contact, and threadable adjustable means on the first mounting portion and having an insulating portion to engage the outside surface of the free-end of the first flexible contact finger, said threadable adjustable means threadably adjusting the setting of the first electrical contact with respect to the second electrical contact, said threadable adjustable means having a threaded portion of greater length than the combined space between the first and second electrical contacts and the third and fourth electrical contacts to force the first and second electrical contacts together which in turn force the third and fourth electrical contacts together to provide an electrical circuit directly between the first and second terminal means through all said electrical contacts in series and thereby shunting the heating element.

3. A thermostatic control mechanism comprising a support frame, a first flexible contact finger having a free-end and a fixed-end, first conductor means electrically connected to said fixed-end of the first flexible contact finger, first insulation means to insulate said first conductor means and said fixed-end of the first flexible contact finger from the support frame, means including said first insulation means insulatingly supporting said fixed-end of the first flexible contact finger on the support frame, a second flexible contact finger spaced from the first flexible contact finger and having a free-end and a fixed-end, said first and second flexible contact fingers constituting a pair and having inside and outside surfaces, a bimetallic strip having a free-end and a fixed-end, second insulation means to insulate said fixed-ends of the bimetallic strip and the second flexible contact finger from the support frame, means including said second insulation means insulatingly supporting the fixed ends of the bimetallic strip and the second flexible contact finger on the support frame, a first electrical contact mounted on the inside surface of the first flexible contact finger, a second electrical contact mounted on the inside surface of the second flexible contact finger, said first and second electrical contact fingers constituting a first pair of engaging contacts, a third electrical contact mounted on the outside surface of the second flexible contact finger, a fourth electrical contact, second conductor means electrically connected to the fourth contact, third insulation means to insulate the second conductor means and the fourth contact from the supporting frame, means including said third insulation means insulatingly supporting said fourth contact on said supporting frame, said third and fourth electrical contacts constituting a second pair of engaging contacts, stop means on the supporting frame and having an insulated portion to engage the free-end of the second flexible contact finger, said stop means limiting the movement of the free-end of said second flexible contact finger toward the first contact finger, the free-end of said second flexible contact finger normally yielding against the insulated portion of the stop means and normally positioning said third electrical contact at a spaced distance from the fourth contact, a heating element electrically connected in shunt with the third and fourth electrical contacts and in series with the first and second electrical contacts and between the first and second conductor means, said bimetallic strip being responsive to heat from the heating element and flexing its free-end thereof to move the second electrical contact in a direction away from the first electrical contact, and threadable adjustable means on the supporting frame and having an insulating portion to engage the free-end of the first flexible contact finger, said threadable adjustable means threadably adjusting the setting of the first electrical contact with respect to the second electrical contact, said threadable adjustable means having a threaded portion of greater length than the combined space between the first and second electrical contacts and the third and fourth electrical contacts to force the first and second electrical contacts together which in turn force the third and fourth electrical contacts together to provide an electrical circuit directly between the first and second conductor means through all said electrical contacts in series and thereby shunting the heating element.

4. A thermostatic control mechanism comprising a support frame, a first flexible contact finger having a free-end and a fixed-end, first conductor means electrically connected to said fixed-end of the first flexible contact finger, means including first insulation means insulatingly supporting said fixed-end of the first flexible contact finger on the support frame, a second flexible contact finger spaced from the first flexible contact finger and having a free-end and a fixed-end, said first and second flexible contact fingers constituting a pair and having inside and outside surfaces, means including said second insulation means insulatingly supporting the fixed-end of the second flexible contact finger on the support frame, a bimetallic strip having a free-end and a fixed-end, means including third insulation means insulatingly supporting the fixed-end of the bimetallic strip on the support frame, a first electrical contact mounted on the inside surface of the first flexible contact finger, a second electrical contact mounted on the inside surface of the second flexible contact finger, said first and second electrical contact fingers constituting a first pair of engaging contacts, a third electrical contact mounted on the outside surface of the second flexible contact finger, a fourth electrical contact, second conductor means electrically connected to the fourth contact, means including fourth insulating means insulatingly supporting said fourth contact on said supporting frame, said third and fourth electrical contacts constituting a second pair of engaging contacts, insulated stop means on the supporting frame to engage the free-end of the second flexible contact finger, said stop means limiting the movement of the free-end of said second flexible contact finger toward the first contact finger, the free-end of said second flexible contact finger normally yielding against the insulated stop means and normally positioning said third electrical contact at a spaced distance from the fourth contact, a heating element electrically connected in shunt with the third and fourth electrical contacts and in series with the first and second electrical contacts and between the first and second conductor means, said bimetallic strip being responsive to heat from the heating element and flexing its free-end thereof to move the second electrical contact in a direction away from the first electrical contact, and threadable adjustable means on the supporting frame and having an insulating portion to engage the free-end of the first flexible contact finger, said threadable adjustable means threadably adjusting the setting of the first electrical contact with respect to the second electrical contact, said threadable adjustable means having a threaded portion of greater length than the combined space between the first and second electrical contacts and the third and fourth electrical contacts to force the first and second electrical contacts together which in turn force the third and fourth electrical contacts together to provide an electrical circuit directly between the first and second conductor means through all said electrical contacts in series and thereby shunting the heating element.

5. A thermostatic control mechanism comprising, a first flexible contact finger, first terminal means electrically connected to said first flexible contact finger, a second flexible contact finger spaced from the first flexible contact finger, said first and second flexible contact fingers constituting a pair, a bimetallic strip, a first electrical contact mounted on the first flexible contact finger, a second electrical contact mounted on the second flexible contact finger, said first and second electrical contact fingers constituting a first pair of engaging contacts, a third electrical contact mounted on the second flexible contact finger, a fourth electrical contact, second terminal means electrically connected to the fourth contact, said third and fourth electrical contacts constituting a second pair of engaging contacts, stop means limiting the movement of said second flexible contact finger toward the first contact finger, said second flexible contact finger normally yielding against said stop means and normally positioning said third electrical contact at a spaced distance from the fourth contact, a heating element electrically connected in shunt with the third and fourth electrical contacts and in series with the first and second electrical contacts and between the first and second terminal means, said bimetallic strip being responsive to heat from the heating element and flexing to move the second electrical contact in a direction away from the first electrical contact, and adjustable means for adjusting the setting of the first electrical contact with respect to the second electrical contact, said adjustable means being movable through an adjustment range greater than the length of the combined space between the first and second electrical contacts and the third and fourth electrical contacts to force the first and second electrical contacts together which in turn force the third and fourth electrical contacts together to provide an electrical circuit directly between the first and second conductor means through all said electrical contacts in series and thereby shunting the heating element.

References Cited in the file of this patent

UNITED STATES PATENTS

| | | |
|---|---|---|
| 2,190,276 | Smith | Feb. 13, 1940 |
| 2,254,946 | Ireland | Sept. 2, 1941 |
| 2,753,437 | Mertler | July 3, 1956 |

FOREIGN PATENTS

| | | |
|---|---|---|
| 645,159 | Germany | May 22, 1937 |